United States Patent [19]
Schmidt

[11] 3,849,192
[45] Nov. 19, 1974

[54] METHOD OF APPLYING AND COOLING LOW DENSITY POLYETHYLENE CABLE INSULATION

[75] Inventor: Gertraud A. Schmidt, Eatontown, N.J.

[73] Assignee: General Cable Corporation, Inc., New York, N.Y.

[22] Filed: May 12, 1972

[21] Appl. No.: 252,871

[52] U.S. Cl............ 117/232, 117/105.3, 117/119.4, 264/174, 264/237
[51] Int. Cl............................ B44d 1/42, B44d 1/44
[58] Field of Search ............ 264/174, 348, 40, 178, 264/237; 117/105.3, 119.8, 119.6, 117/232, 62, 119.4

[56] References Cited
UNITED STATES PATENTS

| | | | |
|---|---|---|---|
| 2,369,858 | 2/1945 | Ryan........................................ | 118/6 |
| 2,732,592 | 1/1956 | Tunnicliff et al. .................. | 264/174 |
| 2,941,254 | 6/1960 | Swerlick.......................... | 264/178 R |
| 3,295,163 | 1/1967 | Bachus............................. | 118/69 X |
| 3,428,726 | 2/1969 | Moss................................. | 264/237 |
| 3,632,720 | 1/1972 | Mildner.......................... | 264/178 R |
| 3,728,424 | 4/1973 | Bauer............................. | 264/348 X |
| 3,729,539 | 4/1973 | Hill ................................ | 264/178 R |

FOREIGN PATENTS OR APPLICATIONS

| | | | |
|---|---|---|---|
| 485,125 | 7/1952 | Canada.............................. | 117/232 |

Primary Examiner—Harry J. Gwinnell

[57] ABSTRACT

This method of applying polyethylene insulation to an electric cable and cooling the polyethylene maintains the thermal stresses in the cooling polyethylene within sufficiently narrow limits so that shrinkage of thick walls of polyethylene insulation do not cause voids in the insulation, and particularly along the inner surfaces of the insulation. The insulation is extruded over a conductor and the insulation then passes through a plurality of cooling baths where the temperature and rate of cooling are controled in such a way as to avoid the setting up of thermal stresses sufficient to cause the formation of voids. The method is suitable for general application and is not tailor made to suit a particular size of wire having a particular thickness of insulation.

10 Claims, 4 Drawing Figures

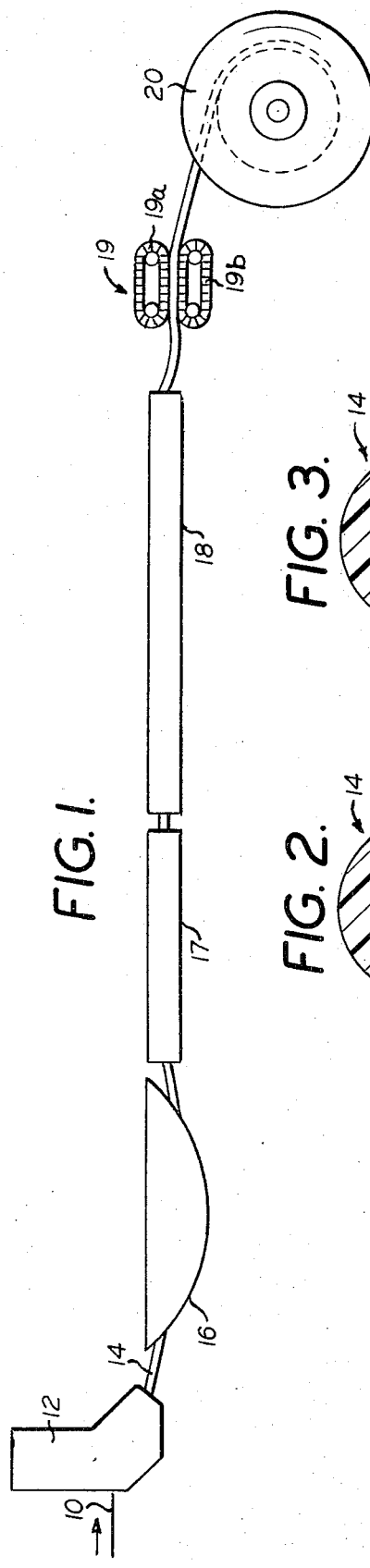
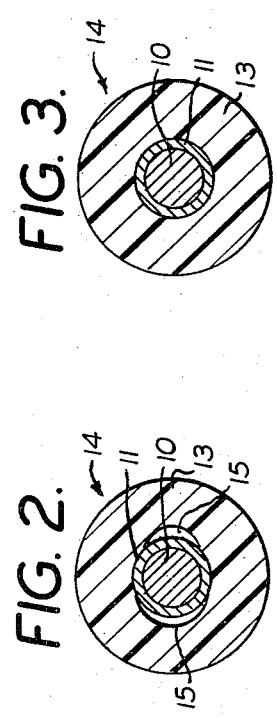
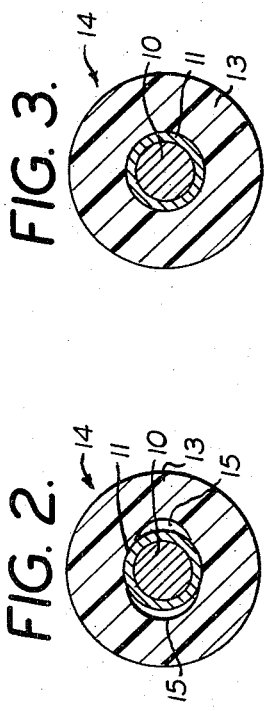
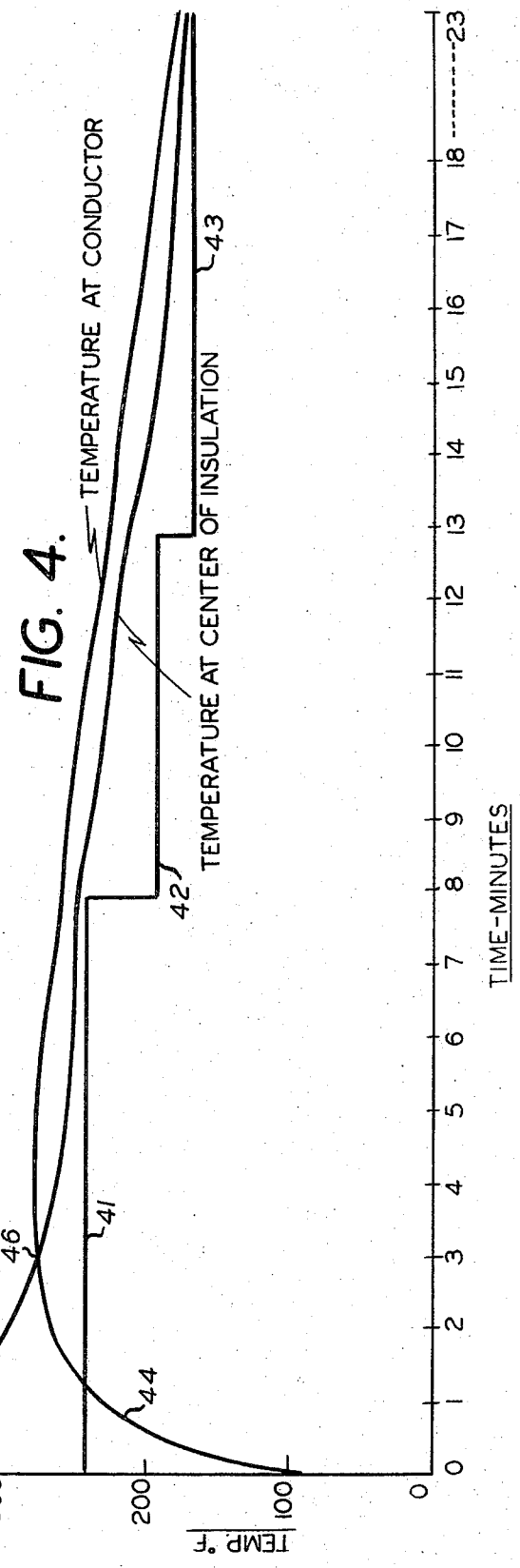

METHOD OF APPLYING AND COOLING LOW DENSITY POLYETHYLENE CABLE INSULATION

PRIOR ART

In one known cooling method, immediately after the insulation is extruded over the conductor, the cable is drawn through three successive water baths contained respectively in a catenary trough, and two relatively flat troughs wherein the temperature of the water in each successive tank is lower than the temperature of the water in the preceding tank. In the first tank the water temperature is 73.9° ± 2.8° C (165° ± 5° F), in the second it is 68.3° ± 2.8° C (155° ± 5° F) and in the third it is 51.7° ± 2.8° C (125° ± 5° F). The cable is drawn through the successive tanks at a rate such that it is in each tank for several minutes.

This method of cooling is suitable on small wires having thin layers of insulation. It is not suitable for large cables with thick insulating walls and it is on large cables that the most damage is done by the existence of voids under the insulation. The method is not suitable for general application to any size of wire for reasons which will be explained.

In another known method the cable is drawn through a slanted copper tube having steam and water at different temperatures in different portions of the tube. The steam in the first portion of the tube is at a temperature of about 134.2° C (274° F) and under pressure of about 30 psi (pounds per square inch). The rate of movement of the cable is such that it is in the steam for a little more than twenty seconds after which it passes through water at a temperature of from about 60° C to about 65.6° C (140° F to about 150° F) for up to about 5 minutes and then through more water at room temperature for up to about 2½ minutes.

Like the first method described above this second method is not effective for cables having insulation which is relatively thick, particularly when the insulation thickness is equal to or greater than the diameter of the conductor. The term "conductor" is used herein to indicate a bare metal conductor to which insulation may be applied and also to a metal conductor having a semi-conducting layer applied over it before being insulated as is common practice with high voltage power cables.

A third known method for cooling extruded insulation on a conductor is disclosed in the patent to Tunnicliff, etal. U.S. Pat. No. 2,732,592. That patent recognizes the fact that polyethylene has its greatest rate of shrinkage at a range near the melting point of the polyethylene. The patent states that the large change takes place in the range between 115° C to 105° C. The method of Tunnicliff attempts to obtain substantially simultaneous solidification of the polyethylene throughout the full thickness of the insulation. The method is used on relatively small diameter conductors and with correspondingly relatively thin insulators. With large cables having thick insulating walls it is impossible to have all of the material of the insulation solidify substantially simultaneously without having the cooling time so long as to be completely unacceptable commercially.

BACKGROUND AND SUMMARY OF THE INVENTION

As extruded polyethylene insulation cools on a conductor, the range of greatest shrinkage is between about 120° C and about 100° C (from about 248° F to about 212° F). The melting point of the low density polyethylene used for insulation is about 115° C, (239° F) and the shrinkage which occurs before solidification begins causes no problem. When the outside surface of the insulation solidifies before the inner insulation has passed through the range of maximum shrinkage, the hardened outer shell cannot contract to compensate for the reduced volume of the inner material and this causes voids to form, generally along the region where the insulation confronts the conductor.

This invention recognizes the fact that it is not possible, in commercial operations, to have the insulation solidify throughout its full thickness at substantially the same time. Because of the poor heat conductivity of polyethylene, there have to be temperature gradients between the inner face of the insulation in contact with the conductor and the outer surface of the insulation which is in contact with whatever medium is used for cooling the polyethylene. This invention prevents the formation of voids by keeping the thermal stresses that are present in the cooling polyethylene within a safe range. These thermal stresses are set up by the radial temperature gradients in the insulation as it cools; and if the temperature gradients can be kept within a sufficiently narrow range, the thermal stresses are not high enough to cause any part of the insulation to pull away from any other part or from the conductor.

In carrying out the method of this invention, the conductor with the extruded polyethylene insulation is passed through successive cooling baths, preferably regions in which the outer surface of the insulation is exposed to contact with liquid, and the invention correlates the time of immersion of the insulation in the liquid with the heat absorbing capacity of the conductor and the temperature of the bath so as to cool the insulation at a rate which keeps the radial temperature gradient within specified temperature limits.

The heat absorbing capacity of the conductor plays an important part in the cooling of extruded polyethylene insulation. Since the conductor is made of metal and is, therefore, a good conductor of heat, and since its specific heat is high enough in the case of large conductors to absorb a substantial quantity of heat from the inner surface of the insulation, any external withdrawal of heat from the insulation must consider the effect of the conductor as a heat sink. If the conductor is large enough in proportion to the thickness of the insulation, the insulation can be cooled in air at room temperature because of the substantial amount of heat absorbed from the insulation by the conductor itself. It has been demonstrated by analog simulation that a 90 mil insulation wall extruded on a 250 MCM (thousand circular mil) copper conductor at room temperature loses heat to the conductor in such a way that no water cooling is necessary. This thickness of insulation has an outside diameter to inside diameter ratio of 1.3:1. The present invention is intended for cables where the insulation has an OD (outside diameter) to ID (inside diameter) ratio greater than 1.3:1, and especially for ratios as large as 3:1.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view of apparatus for extruding and cooling insulation on a conductor in accordance with this invention;

FIG. 2 is a cross-section through a cable in which the insulation has cooled too rapidly from the outside and has formed voids along the conductor which are demonstrated in a greatly exaggerated size.

FIG. 3 is a view similar to FIG. 2 but showing a conductor made in accordance with this invention and having a void free insulation; and FIG. 4 is a graph illustrating the operation of the invention.

DESCRIPTION OF PREFERRED EMBODIMENT

Referring to FIG. 2 of the drawings, wherein the manufacture of a cable 14 low density polyethylene insulation 13 is extruded over a wire conductor 10, or over a conductor-shielding coating 11 of semiconductive material of the conductor 10 (as illustrated in FIG. 2) and the insulation is cooled by previously used methods, the exterior of the insulation cools and hardens while the interior portions are still quite hot. The interior portions must then shrink within the space defined by the hardened outer surface portion so that shrink voids 15 form between the shielded conductor 10 and the insulation 13.

The present invention is a method of cooling the extruded low density polyethylene insulation 13 in a manner which prevents the formation of shrink voids so that the insulation 13 is uniformly and closely adjacent to the conductor 10, or to a shielding coating 11 thereon, around and along the cable as illustrated in FIG. 3.

The method of this invention will now be described with reference to the apparatus shown in FIG. 1. It will be appreciated, however, that the method may suitably be carried out with different apparatus and that the apparatus shown in FIG. 1 is shown for illustrative purposes only.

Referring to FIG. 1, a conductor 10, which may be a bare conductor, or a conductor on which a shield coating of semi-conductive material 11 is extruded, such as a synthetic resin plastic incorporating carbon black, is fed from a pay-off reel, or other supply, through a conventional extruder 12 which extrudes low density polyethylene insulation 13 over the conductor 10, the cable with the extruded insulation thereon being designated cable 14. When the cable 14 emerges from the extruder 11 the temperature of the insulation is about 182° C (360° F) throughout the full thickness of the insulation.

From the extruder 12, the cable 14 passes through a cooling zone comprising a trough 16 in which the cable is immersed in a liquid, such as ethylene glycol. This liquid is compatible with polyethylene and has a boiling point substantially higher than the melting point of polyethylene. Steam can be used but a liquid bath is preferred; and water is objectionable because its boiling point is too low under standard conditions. It is advantageous to keep the apparatus simple by not requiring that the cooling baths be under pressure. Any liquid, having a sufficiently high boiling point, and which is compatible with the polyethylene insulation can be used as the coolant in the trough 16.

It is important that the trough 16 be shaped so that the cable 14 can follow a catenary course since the insulation is too hot to have the strength required for running over guides. The term "catenary course" is used in a broad sense to indicate a sagging path whether or not a true catenary.

Cable 14 is shown in the drawing as passing through a short span in the atmosphere between the extruder 12 and the first trough 16. When there is such a span of passage through air it is important that the insulation not cool to a temperature as low as the melting point of the polyethylene, and preferably not as low as 120° C (248° F).

In practice the trough 16 has been made 55 feet long and the cooling liquid in the trough maintained at a temperature of 115° C. The cable has been advanced through the trough so as to be immersed in the liquid for 7 minutes. This has been satisfactory on wire of a certain size, as will be explained. Considering the invention in its broader aspects, the cable 14 is advanced through the first bath in trough 16 while the temperature of the outside of the insulation on the cable 14 is maintained at least as high as approximately the melting point of the polyethylene. Thus the polyethylene does not cool to a temperature substantially below 115° C during the time that it is passing through the trough 16. Equally important is the correlating of the time of immersion of the cable 14 in the trough 16 with the heat absorbing capacity of the conductor and the temperature of the bath so as to cool the insulation, by the time it reaches the discharge end of the trough 16, to a radial temperature gradient within about 20 percent of the temperature of the outside of the insulation. In order to obtain this correlation, it may be necessary to increase the temperature of the liquid in the trough 16, to increase or decrease the time of immersion depending upon the size of the conductor and the thickness of the insulation. Adjustment of variables of this correlation can be computed.

Cable 14 passes from the trough 16 to a trough 17 which is preferably a horizontal trough in which the cable 14 is supported on guides such as supporting sponges. Cooling liquid is used in the trough 17 and water is suitable. The invention has been used with the water temperature at the entrance end of the trough 17 at a temperature of 92° C and with the water temperature at the discharge end of the trough 17 at a temperature of 86° C. In the construction illustrated the cable 14 passes through short air gaps in entering and leaving the trough 17 and in the case of both air gaps, the cooling should not be sufficient to interfere with the correlations described for the cooling in the troughs 16 and 17.

Since the cable 14 travels continuously through the apparatus without any loop accumulators, it is evident that the speed of the cable must be the same in the troughs 16 and 17 and in a subsequent trough 18 which will be described. Because of this uniform speed of advance of the cable, the lengths of the troughs 16, 17 and 18, with respect to one another, must be in the same proportion as the time of immersion which the cable is to have in each trough. In practice the trough 17 has been made somewhat shorter than the trough 16 so that a cable passing through the trough 16 in 7 minutes passes through the trough 17 in 5 minutes.

This time of immersion and the temperatures of the liquid in the trough 17 are for a particular wire size and insulation thickness, as will be explained, and in connection with the broader aspects of the invention, the cable of 14 must be passed through the second bath in the trough 17 with the temperature in the second bath correlated with the time of immersion of the cable within the second bath so as to cool the outside of the insulation below 100° C, the lower limit of maximum shrinkage of the polyethylene, while maintaining the radial temperature gradient in the polyethylene within a range of about 30 percent of the highest temperature within the radial extent of the insulation at every instant during the cooling in the trough 17.

By the time the cable 14 reaches the trough 17, the insulation next to the conductor will almost always be at the highest temperature. This is not true near the entrance end of the first trough 16 where the insulation next to the conductor is being cooled by absorption of heat from the polyethylene by the conductor as will be explained in connection with FIG. 4. The purpose of the cooling in the trough 17 is to slow down the cooling of the outside surface of the conductor so that heat can flow through the polyethylene to the surrounding liquid at a rate which will prevent steep radial temperature gradients from developing in the insulation. As long as the temperature gradients are kept within limits, the thermal stresses are correspondingly reduced and the material of the insulation has sufficient adhesion to prevent the stresses from causing voids to form.

The cable 14 passes from the trough 17 into the third cooling trough 18 and the function of the trough 18 is essentially the same as that of the trough 17. Actually the troughs 17 and 18 may be combined into one long trough except that somewhat better control and correlation of the cooling can be obtained by having the troughs 17 and 18 separate because it permits the use of a wider choice of water temperatures in the troughs 17 and 18 than could be obtained if they are combined into a single long trough.

As in the trough 17, the cable after passing into the trough 18 must be cooled by having the temperature of the liquid in the trough 18 correlated with the time of immersion of the cable in this third bath so as to continue the cooling of the insulation while maintaining the radial temperature gradient in the insulation within a range of about 30° of the highest temperature within the radial extent of the insulation at every instant during the passage of the cable through the trough 18.

In practice water has been used in the trough 18 with the water at a temperature of 88° C at the entrance end of the trough and a temperature of 70° C at the discharge end of the trough; and the trough 18 has been made of such length that a cable that passes through the trough 17 in 5 minutes requires 10 minutes to pass through the trough 18. It will be evident that the temperatures of the coolant in trough 18 may have to be changed from the examples given above in order to maintain the correlation described. In the practice of the invention, troughs 17 and 18 have been used of lengths of about 35 and 75 feet, respectively. The cable was advanced through them at a rate of about 7 feet per minute.

Cable 14 leaves the delivery end of the trough 18, in which the cable is supported as in the trough 17, and the cable passes through an air space to a caterpillar forwarding device 19 which delivers the cable to a takeup reel 20. The span between the exit of the trough 18 and caterpillar forwarding device 19 can be about 4 feet so that the cable moving 7 feet per minute is in air for about ½ a minute in its movement from the trough 18 to the caterpillar 19 and some additional cooling takes place in the air to about 65° C. The examples of trough lengths, speeds and coolant temperatures in the foregoing description of the apparatus were used on 35 KV (kilovolt) power cable with low density polyethylene insulation extruded 0.345 inch thick over a No. 2 AWG (American Wire Gauge) annealed uncoated copper conductor with a 0.015 inch thick semiconducting shield thereon.

Experience has shown that the occurrence of shrink voids were substantially eliminated by the method of this invention employing the apparatus temperatures described above. Total elimination of voids can be obtained by advancing the cable at slower speeds so that cooling time is prolonged and temperature gradients further reduced. It is, of course, advantageous in commercial production to run at speeds as high as possible so long as such voids as occur are kept within acceptable limits; but the principle of this invention permits the total elimination of voids and the reduction of voids to any limit acceptable having in mind the use for which the cable is intended.

FIG. 4 shows the rate of cooling of the insulation on the 35 KV power cable with the 0.345 inch polyethylene insulation referred to above. In this graph the horizontal line 41 represents the temperature of the coolant in the first trough 16; the horizontal line 42 represents avg. temperature of the coolant in the trough 17 and the third horizontal line 43 represents avg. temperature of the coolant in the last trough 18.

The curved line 44 represents the temperature at the outside surface of the conductor. This is originally room temperature, but as soon as the insulation is extruded over the conductor, the temperature of the outside surface of the conductor and the contacting surface of the insulation change rapidly until they become equal to one another almost instantaneously. Thus the insulation is chilled as it comes into contact with the conductor at room temperature but rapidly heats the conductor and the heat flow from the other insulation behind that which actually contacts with the conductor continues to supply heat to the surface of the insulation that touches the conductor so that the temperature of the insulation at the conductor rises rapidly as indicated by the steep slope of the line 44 during the first minute following extrusion of the insulation on to the conductor.

The insulation gives up heat from its outside surface as soon as the insulation leaves the extruder. This heat is given up first to the surrounding air and then to the liquid coolant in the trough which is at the temperature indicated by the line 41. The insulation midway between the conductor and the outside surface of the insulation originally gives up heat to both the conductor and the surrounding air or liquid which contacts with the outside surface. Thus the temperature at the center of the insulation wall falls rapidly as indicated by the curved line 45 during the first three minutes following exit of the insulation from the extruder.

The heat sink effect of the conductor is for a limited time only and as soon as the conductor has been heated through to a temperature equal to that of the insulation in contact with it, further cooling of the insulation which is at the conductor must be effected by a radial heat flow outward and through the outer surface of the insulation. This cannot occur until the outer insulation has cooled to a temperature lower than the inner insulation, and the condition is met in the vicinity of the point 46 on the graph of FIG. 4.

The temperature of the insulation at the conductor remains substantially constant for a short period until the temperature gradient from the outside surface has an upward slope beyond the center of the insulation wall and all the way to the insulation in contact with the conductor. Then the curves 44 and 45 both move to lower temperatures at the same time but with the rate of cooling of the outside surface progressively slower as the temperature of the outside surface approaches the temperature of the coolant.

FIG. 4 does not show a curve for the temperature of the outside surface of the insulation because this temperature will be the same as the line 45 at the left hand end of the line 45 where the insulation is discharged from the extruder and will decline slightly faster than the line 45 because of the direct contact of the outside surface first with the air and then with the coolant in the first cooling trough. The temperature of the outside surface can be considered, therefore, as a curve under the curve 45 with a similar sag and above the line 41. If the cable moves slowly enough, the temperature of the outside surface would become equal to the temperature of the temperature line 41, but in practice the cable moves faster than this since it is never desirable to have the heat flow drop to zero.

The temperature curves 44 and 45 continue to descend as the cable passes through the second cooling trough represented by the space above the line 42 in FIG. 4. To the extent that the outside surface cools faster than heat can flow from the inside portions of the insulation, the lines 44 and 45 will diverge somewhat from one another and they do diverge to some extent during part of the cooling in the second trough. To keep this divergence within the desired limits previously set forth, the temperature of the coolant in the second cooling trough must be kept high enough to avoid a rate of surface cooling which is substantially higher than the rate of heat flow which occurs from the inside of the insulation radially outward. Since the temperatures are known by computation, and the coefficient of heat transmission through the polyethylene is also known, as well as the thickness of the insulation wall, the temperature of the coolant in the second trough can be determined by computation in order to maintain the temperature gradients within the 30 percent limit already set forth.

Cooling while passing through the third trough is represented by the portions of the lines 44 and 45 above the temperature line 43. Considerations here are the same as the cooling in the second trough but lower temperature coolant can be used because the temperature of the insulation is lower and lowered temperature coolant is therefore necessary in order to maintain the same temperature gradients for removing heat from the interior of the insulation.

While the graph of FIG. 4 is for a particular size of cable having insulation of a particular thickness, it is illustrative of the operation of the invention and is given merely by way of illustration. Cooling curves for other sizes of wire and other thicknesses of insulation will be of a similar nature to FIG. 4 though actual figures and slopes will vary somewhat and the curves for any size of wire of thickness of insulation wall can be drawn ahead of time by computing the values of heat flow since all of the figures necessary for such computation are known before the cooling operation has to be performed on any particular wire.

The preferred embodiment of the invention has been illustrated and described, but changes and modifications can be made, and some features can be used in different combinations without departing from the invention as defined in the claims.

What is claimed is:

1. The method of applying and shrinking polyethylene insulation over metal conductors of electric cables having insulation of a radial thickness of substantially 0.345 inch and having a maximum shrinkage within a critical range from about 120° C to about 100° C and a ratio of outside diameter to inside diameter greater than about 1.3:1 which method comprises;
   a. Extruding the polyethylene over a conductor with the polyethylene at a temperature substantially higher than the melting point of the polyethylene,
   b. Advancing the cable from the region of extrusion and along a substantially catenary course into a first cooling zone, the temperature of the polyethylene being substantially higher than 120° C,
   c. Maintaining the temperature of the outside of the insulation in the first cooling zone at least as high as approximately the melting point of the polyethylene,
   d. Continuing the immersion of the cable in the first zone with the heat absorbing capacity of the conductor and the temperature of the zone sufficient to cool the insulation at the outlet end of the first zone to a radial temperature gradient within about 20 percent of the temperature of the outside of the insulation,
   e. Advancing the cable from the first zone into a second zone,
   f. Maintaining the temperature of the second zone and the time of immersion of the cable in the second zone to cool the outside of the insulation below 100° C, the lower limit of maximum shrinkage of the polyethylene, while maintaining the radial temperature gradient in the polyethylene within a range of about 30 percent of the highest temperature within the radial extent of the insulation at every instant during the cooling in the second zone, and
   g. Maintaining the radial temperature gradient within said 30 percent range until all of the polyethylene has cooled below the 100° C so as to distribute shrinkage stresses more uniformly throughout the radial thickness of the insulation.

2. The method described in claim 1 comprising maintaining the first zone at a temperature of approximately 115° C.

3. The method described in claim 2 wherein the first zone consists of a liquid bath compatible with low density polyethylene and said liquid has a boiling point substantially in excess of 115° C, and the cable is cooled on its way from the extruder to the first zone.

4. The method described in claim 2 wherein the second zone comprises a liquid bath having a temperature of approximately 92° C at the entrance to the bath and a temperature of approximately 86° C at the discharge end of the bath.

5. The method described in claim 1 wherein the final cooling of the insulation is performed in a third zone comprising a bath with liquid at a substantially lower temperature than 86° C.

6. The method described in claim 5 wherein the first zone comprises a bath at a temperature of approximately 115° C, the second zone comprises a bath at a temperature of approximately 92° C at its entrance end and at a temperature of approximately 86° C at its discharge end, and the third bath having a temperature of approximately 88° C at its entrance end and a temperature of approximately 70° C at its discharge end, and moving the cable along a horizontal path in the second and third baths.

7. The method described in claim 1 wherein the temperature gradient in the insulation in the first zone is within about 10 percent of the temperature of the outside surface of the insulation, and maintaining the temperature gradient in the insulation in the second zone within a range of about 20 percent of the highest temperature within the radial extent of the insulation at every instant during the cooling in the second zone.

8. The method described in claim 1 comprising immersing the cable in a liquid bath in the first zone, with the liquid at a temperature of about 115° C, for at least about 7 minutes, said first zone bath being a liquid that is compatible with said polyethylene and that does not promote stress cracking of the polyethylene at temperatures of the order of 115° C, and then passing the cable through liquid in a second bath in the second zone, and in which the liquid at the entrance end of the bath is at a temperature of about 92° C and decreases to a temperature of about 86° C at the exit end of the second zone, each portion of the cable being in said second bath for at least about 5 minutes, and immediately after the cable emerges from the second bath, passing the cable through a third liquid bath in a third zone and in which the temperature of the liquid is about 88° C at the entrance end of the third liquid bath and about 82° C at the middle zone of said third liquid bath and is about 70° C at the discharge end of said third bath, each portion of the cable being in said third liquid bath for at least about 9 minutes.

9. The method described in claim 1 comprising cooling the insulation in the first zone by contact with ethylene glycol.

10. The method described in claim 1 comprising extruding on the conductor polyethylene insulation in heat-exchanging contact with the conductor and with a ratio of the outside diameter of insulation to the inside diameter of the insulation of at least 3:1.

* * * * *